United States Patent [19]
McCrery, Jr.

[11] 3,797,463
[45] Mar. 19, 1974

[54] LIVESTOCK TRAP AND SORTER

[76] Inventor: David N. McCrery, Jr., 1302 E. Broadway, Monmouth, Ill. 61462

[22] Filed: Jan. 19, 1973

[21] Appl. No.: 324,985

[52] U.S. Cl. .............................................. 119/155
[51] Int. Cl. ........................................... A01k 29/00
[58] Field of Search .................................... 119/155

[56] References Cited
UNITED STATES PATENTS

| | | | |
|---|---|---|---|
| 1,757,426 | 5/1930 | Haynes | 119/155 |
| 1,566,552 | 12/1925 | Manson et al. | 119/155 X |
| 1,381,797 | 6/1921 | Caspers | 119/155 |
| 3,072,100 | 1/1963 | Dustin | 119/155 |

*Primary Examiner*—Hugh R. Chamblee
*Attorney, Agent, or Firm*—Berman, Bishoff & Platt

[57] ABSTRACT

An animal trapping and sorting gate assembly consisting of a rectangular frame having vertical spaced rails, one inner vertical rail being horizontally adjustable and the adjacent inner vertical rail being mounted on top and bottom horizontal arms pivoted on a common vertical axis to the top and bottom horizontal elements of the frame. The pivoted vertical rail is biased toward a centered position coplanar with the frame, by a spring. A pin may be inserted through the top horizontal element of the frame to limit swinging movement of the pivoted vertical rail to only one direction from its centered position so that the gate assembly may be employed with an enclosure to allow animals to enter the enclosure but to allow only animals under a predetermined size to leave the enclosure.

8 Claims, 6 Drawing Figures

PATENTED MAR 19 1974  3,797,463
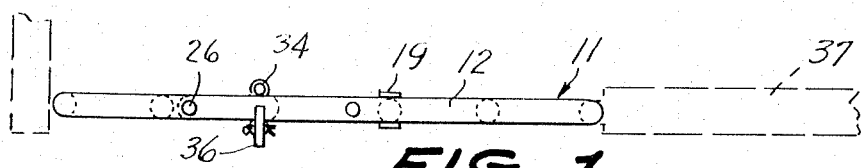
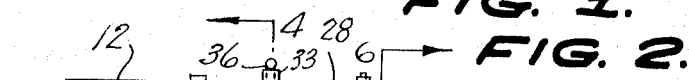
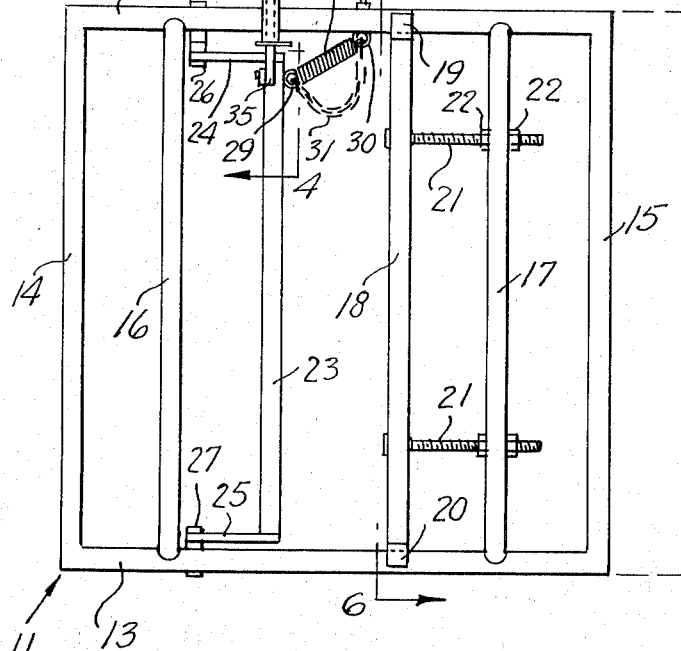
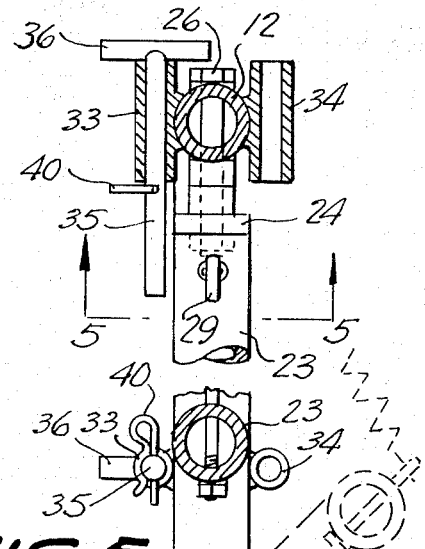
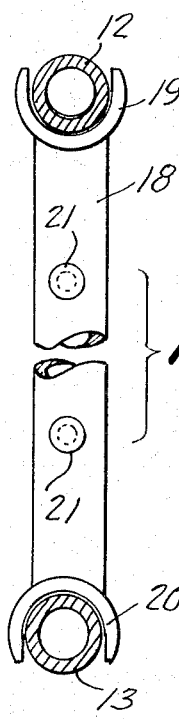

LIVESTOCK TRAP AND SORTER

This invention relates to animal sorting devices, and more particularly to an animal trapping and sorting gate assembly adapted to be employed with a suitable enclosure for allowing hogs or other animals to enter the enclosure but to allow only animals under a predetermined size to leave the enclosure, whereby the larger animals will be retained within the enclosure.

A main object of the invention is to provide a novel and improved animal trapping and sorting gate assembly adapted to be employed with an enclosure for sorting, classifying or separating hogs or similar domestic animals according to size, the gate assembly being relatively simple in construction, being easy to install, and being readily adjustable to provide any desired opening size, in accordance with the size of the animals desired to be retained in the associated enclosure.

A further object of the invention is to provide an improved animal trapping and sorting gate assembly for use in classifying, sorting or separating hogs or similar domestic animals according to size, and therefore according to weight, the gate assembly being inexpensive to fabricate, being sturdy in construction, having a minimum number of movable parts, and being easy to adjust.

A still further object of the invention is to provide an improved animal trapping and sorting gate assembly for use with a pen or similar enclosure for sorting, classifying or separating hogs or similar farm animals according to size, the gate assembly being relatively inconspicuous in appearance, being light in weight and easy to handle, and providing a simple and effective means for automatically sorting hogs or similar farm animals according to size.

Further objects and advantages of the invention will become apparent from the following description and claims, and from the accompanying drawings, wherein:

FIG. 1 is a top plan view of an improved animal trapping and sorting gate assembly constructed in accordance with the present invention.

FIG. 2 is a front elevational view of the gate assembly shown in FIG. 1.

FIG. 3 is an end elevational view of the gate assembly of FIGS. 1 and 2.

FIG. 4 is an enlarged vertical cross-sectional view taken substantially on line 4—4 of FIG. 2.

FIG. 5 is a horizontal cross-sectional view taken substantially on line 5—5 of FIG. 4.

FIG. 6 is an enlarged fragmentary transverse vertical cross-sectional view taken substantially on line 6—6 of FIG. 2.

In separating hogs or similar farm animals for market, it is customary to separate the animals in accordance with size, since the size of the animals is an indication of their weights. For example, to obtain the best market price for an animal, it should have at least a minimum weight, of the order of at least 200 pounds, as an example. Thus, when a farmer desires to market his animals, it is ordinarily necessary for him to separate out all those above a minimum weight, which also corresponds to a definite minimum size.

A prime purpose of the present invention is to provide an automatic sorting gate assembly which a farmer may place at the entrance of a pen or similar enclosure to allow all of his animals to enter the enclosure, but to prevent animals above said specific size from leaving the enclosure.

Referring to the drawings, 11 generally designates an improved animal trapping and sorting gate assembly constructed in accordance with the present invention. The assembly 11 comprises a rectangular frame having a top horizontal rail 12 and a bottom horizontal rail 13, rigidly connected at their ends by vertical end rails 14 and 15. Additional vertical rails 16 and 17 are connected rigidly to the top and bottom rails 12 and 13, and are spaced inwardly from the end vertical rails 14 and 15, as is clearly shown in FIG. 2. The gate assembly may include any number of fixed additional vertical rails such as the rails 16 and 17.

The innermost rail member at the right side of the gate assembly 11, as viewed in FIG. 4, comprises an adjustable vertical rail 18 having top and bottom guide channels 19 and 20 slidably receiving the top and bottom horizontal rail members 12 and 13 and being adjustably connected to the adjacent fixed vertical rail member 17 by horizontal screws 21, 21 which are rigidly secured to the rail member 18 and which extend through the adjacent vertical rail member 17, being adjustably locked in place by pairs of clamping screws 22, 22 provided thereon and engaging on opposite sides of the rail member 17, as is clearly shown in FIG. 2. As will be presently explained, the vertical rail member 18 is adjustably in accordance with the limiting size of the animals to be retained in the enclosure with which the gate assembly is to be employed.

The vertical spaced horizontal screw members 21, 21 may be rigidly secured to the inner rail member 18 in any suitable manner, for example, by being welded thereto or by being clamped thereto by suitable clamping nuts provided on the screws.

The innermost vertical rail member on the left side of the assembly 11, as viewed in FIG. 2, is designated at 23, and this rail member is provided with top and bottom horizontal arms 24 and 25 which are pivotally connected at 26 and 27 respectively to the top and bottom fixed horizontal rail members 12 and 13 on a common vertical axis. Thus, the pivotal connections of the horizontal arms 24 and 25 comprise vertical pivot bolts, similar to the vertical pivot bolts 26, shown in FIGS. 4 and 5. The swingable vertical rail member 23 is biased toward a centered position substantially coplanar with the main frame by a coil spring 28 having one end loop 29 connected to the upper portion of vertical rail member 23 and having an opposite end loop 30 connected to the fixed horizontal top rail member 12 at a location spaced inwardly from the vertical rail member 23. A short length of chain 31 connects the opposite end loops 29 and 30, limiting the stretching of the coil spring 28 but nevertheless allowing the rail member 23 to swing to a wide open position, namely, to a position wherein the arms 24 and 25 may extend almost perpendicular to the plane of the fixed main frame.

Rigidly secured to the top horizontal rail member 12 upwardly adjacent the top supporting arm 24 are respective sleeve-like vertical sockets 33 and 34 located on opposite sides of the plane of the main frame of the assembly and adapted to selectively receive a vertical pin member 35. The pin member 35 has a top cross bar 36 and has a shank which is of sufficient length so that it extends substantially below the upper supporting arm 24 and therefore acts as a stop means for said upper supporting arm to limit swinging movement thereof. Thus, when the pin member 35 is inserted in the sleeve member 33, the arm 24 may only swing in a direction away from the pin member 35. For example, when the assembly is arranged in a manner diagrammatically illustrated in FIGS. 1, 2 and 3, in the entrance to an enclosure 37, such as a pen or the like, the swingable rail member 23 can only swing inwardly, namely, in a counterclockwise direction, as viewed in FIG. 1, allowing all animals to freely enter the enclosure, but cannot swing outwardly, whereby animals above a size determined by the minimum spacing between rail member 23 and the adjacent rail member 18 cannot leave the enclosure. As above-mentioned, this minimum size can be adjusted in accordance with the adjusted position of the rail member 18. Therefore, animals which are below the selected minimum size can freely leave the enclosure whereas animals which are above said selected minimum size are retained in the enclosure 37.

The stop pin 35 may be retained in a selected socket 33 or 34 by the provision of a suitable cotter pin 40 engaged through the lower portion of the shank of the stop pin, namely, below the selected sleeve-like socket 33 or 34. As will be apparent from the above-description, in using the device, it is set into the opening of the enclosure 37, and under ordinary conditions, the stop pin 35 is not used, whereby the animals are allowed to pass freely back and forth into and out of the enclosure 37. When the farmer decides to sort the animals for sale, he sets the rail member 18 at a position corresponding to the desired minimum size and then inserts the stop member 35 in the outer sleeve-like socket 33 in the position shown in the figures, locking the stop pin in position by means of the cotter pin 40. Under these conditions, the animals are allowed to freely enter the enclosure but only the animals below the selected minimum size can pass through the space defined between rail member 23 and rail member 18 when the rail member 23 is in its normal position coplanar with the frame of the assembly.

The enclosure 37 may comprise the normal feeding area for the animals so that the animals are accustomed to pass into said enclosure to obtain food. Thus, the sorting gate assembly 11 automatically performs the sorting operation after the farmer has inserted the stop pin 35 in the outermost sleeve-like socket 33 in the manner above-described.

Under normal conditions, the stop pin 35 may be supported horizontally with one end of the handle portion 36 engaged in one of the sockets 33 or 34.

While a specific embodiment of an improved animal trapping and sorting gate assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An animal trapping and sorting gate assembly for use with an enclosure, comprising a frame having top and bottom elements and barrier means including a plurality of vertical elements extending between said top and bottom elements, said vertical elements defining a passage for animals bounded by two inner vertical elements, one of said inner vertical elements having supporting means pivotally connected to the frame to support said one inner vertical element for swinging movement around a laterally spaced vertical axis, means biasing said one inner vertical element toward a normal centered position substantially coplanar with the frame, and means to limit such swinging movement to one side of the frame when animals are to be sorted as to size, wherein said top element of the frame is provided with vertical sleeve-like socket means and said means to limit swinging movement comprises removable pin means insertable through said sleeve-like socket means and of sufficient length to extend adjacent said support means.

2. The animal trapping and sorting gate assembly of claim 1, and wherein said support means comprises respective top and bottom horizontally extending members arms secured to said one inner vertical element and pivotally connected to the top and bottom horizontal elements of the frame on a common vertical axis.

3. The animal trapping and sorting gate assembly of claim 1, and wherein said biasing means comprises a coiled spring connecting said one inner vertical element to the frame.

4. The animal trapping and sorting gate assembly of claim 1, and means to horizontally adjust the other inner vertical element, whereby to vary the normal width of said passage.

5. The animal trapping and sorting gate assembly of claim 4, and respective guide means on the top and bottom ends of said other inner vertical element slidably engaging the horizontal top and bottom elements of the frame.

6. The animal trapping and sorting gage assembly of claim 5, and wherein said support means comprises respective top and bottom horizontally extending arms secured to said one inner vertical element and pivotally connected to thetop and bottom horizontal elements of the frame on a common vertical axis.

7. The animal trapping and sorting gate assembly of claim 6, and wherein said biasing means comprises a coil spring connecting said one inner vertical element to the frame.

8. The animal trapping and sorting gage assembly of claim 7, and wherein said socket means on the top horizontal element of the frame comprises respective vertical sleeve-like sockets located on opposite sides of the normal centered position of the top arm and adapted to selectively receive said pin means.

* * * * *